(12) United States Patent
Ranjbar

(10) Patent No.: US 11,757,393 B2
(45) Date of Patent: Sep. 12, 2023

(54) INTEGRATED POWER MODULE WITH TRANSFORMER-LESS GATE DRIVER FOR HIGH VOLTAGE POWER INVERTERS

(71) Applicant: DANA TM4 INC., Boucherville (CA)

(72) Inventor: Amir Ranjbar, Boucherville (CA)

(73) Assignee: DANA TM4 INC., Boucherville (CA)

( * ) Notice: Subject to any disclaimer, the term of this patent is extended or adjusted under 35 U.S.C. 154(b) by 36 days.

(21) Appl. No.: 17/451,459

(22) Filed: Oct. 19, 2021

(65) Prior Publication Data
US 2023/0118348 A1   Apr. 20, 2023

(51) Int. Cl.
| | | |
|---|---|---|
| *H03K 17/082* | (2006.01) | |
| *H02P 27/06* | (2006.01) | |
| *H02M 1/08* | (2006.01) | |

(52) U.S. Cl.
CPC .............. *H02P 27/06* (2013.01); *H02M 1/08* (2013.01); *H02P 2201/05* (2013.01)

(58) Field of Classification Search
CPC ...... H02P 27/06; H02P 2201/05; H02M 1/08; H03K 17/0822; H01L 21/761
See application file for complete search history.

(56) References Cited

U.S. PATENT DOCUMENTS

| | | | |
|---|---|---|---|
| 8,558,584 B2 | 10/2013 | Draxelmayr et al. | |
| 9,531,373 B2 | 12/2016 | Sicard et al. | |
| 9,729,042 B2 | 8/2017 | Miyauchi et al. | |
| 2006/0034107 A1 | 2/2006 | West | |
| 2017/0271195 A1* | 9/2017 | Hyerby | ................. H01L 21/761 |
| 2018/0034384 A1* | 2/2018 | Imura | ................. H03K 17/0822 |
| 2020/0288562 A1* | 9/2020 | Okagawa | ............... H05K 7/209 |

FOREIGN PATENT DOCUMENTS

DE   102016123678 A1   6/2018

OTHER PUBLICATIONS

Diallo, M., "Bootstrap Circuitry Selection for Half-Bridge Configurations," Texas Instruments Website, Available Online at https://www.ti.com/lit/an/slua887/slua887.pdf?ts=1634517211538&ref_url=https%253A%252F%252Fwww.google.com%252F, Available as Early as Aug. 2018, 10 pages.
"Design and Application Guide of Bootstrap Circuit for High-Voltage Gate-Drive IC," ONSEMI Website, Available Online at https://www.onsemi.com/pub/collateral/and9674-d.pdf, Available as Early as Aug. 2021, 15 pages.

* cited by examiner

*Primary Examiner* — Cortez M Cook
(74) *Attorney, Agent, or Firm* — McCoy Russell LLP

(57) ABSTRACT

A drive circuit for an electric machine is disclosed. In one example, the drive circuit utilizes a bootstrap capacitor and a bootstrap diode, followed by a regulator, as a basis for driving a gate of a power stage of an inverter. The regulated voltages from the bootstrap capacitor and bootstrap diode eliminate the need for using a transformer for driving the gate of the power stage of the inverter.

17 Claims, 7 Drawing Sheets

INTEGRATED POWER MODULE WITH TRANSFORMER-LESS GATE DRIVER FOR HIGH VOLTAGE POWER INVERTERS

TECHNICAL FIELD

The present disclosure relates to a system and method for supplying power to an electric machine. The system may include an inverter comprising a power stage that is driven via a transformer-less gate driver.

BACKGROUND AND SUMMARY

A vehicle may be propelled via an electric machine. The electric machine may be supplied power from a battery. The direct current (DC) power that is provided by the battery may be routed through an inverter that may selectively switch battery power to the electric machine. The inverter may include a power stage with transistors that may be driven via a driver amplifier or a gate driver on an external gate driver board. The gate driver board may include gate driver integrated circuits (ICs) and transformers to regulate voltage that is supplied to the gates of transistors in the power stage. The gate driver integrated circuits and the transformers are relatively expensive and the transformers are relatively large in size. As such, the gate driver ICs and the transformers are placed on a board (e.g., a gate driver board) that is separate from the board that includes the power stage transistors. In addition, placing the transformers on the external gate driver board increases the gate loop circuit length, which may limit the inverter's maximum switching frequency.

In U.S. Patent Publication 2006/0034107, a bootstrap capacitor is used to provide a voltage to a transistor gate in a low voltage circuit (e.g., less than 48 VDC). However, this approach has issues because the bootstrap capacitor voltage in each of the described circuits is unregulated and it may be reduced more than may be desired due to an increasing operating duty cycle. In particular, as a gate switching duty cycle increases, the bootstrap capacitor voltage may decrease and the bootstrap capacitor may decrease even further if DC/DC converters consume power from the bootstrap capacitor. The decreasing capacitor voltage may increase inverter power losses and the power output stage is not capable of operating at a 100% duty cycle since the bootstrap capacitor voltage is not regulated and the bootstrap capacitor voltage is reduced as the duty cycle is increased. Additionally, the bootstrap capacitor is placed externally from the power stage on a gate driver board, which increases a gate loop circuit trace length. The increased gate loop circuit trace length increases gate loop parasitic inductance, which tends to create high voltage spikes as the bootstrap capacitor goes through charging and discharging periods. The capacity and size of the bootstrap capacitor increases exponentially as the required gate charge increases to allow for a low voltage drop across the bootstrap capacitor. In conventional high voltage applications (e.g., greater than 48 VDC), bootstrap capacitors are not used since the size of the bootstrap capacitors would increase even more because of high gate charge levels. In addition, it may be desirable to isolate a lower voltage bus and lower voltage devices from a higher voltage bus and higher voltage devices to reduce a possibility of system degradation. However, a conventional bootstrap gate drive does not provide such isolation. Further, conventional designs may not allow for negative gate voltages that may be required to turn transistors off in high power applications. In addition, in conventional bootstrap methods, power stage transistors may have to be switched several times before bootstrap capacitor voltages are increased to levels that allow the circuit to operate as desired, which may increase an amount of time it takes for the driver circuit to be operable. Finally, elements in the bootstrap capacitor charge loop and the length of the bootstrap capacitor charge loop may cause a long time constant for the bootstrap capacitor charge loop so that the duty cycle of the circuitry may be further limited to less than 100%.

The inventor herein has recognized the above-mentioned issues and has developed a drive circuit for an electric machine, comprising: a first transistor; a second transistor, the second transistor arranged in series with the first transistor and directly electrically coupled to the first transistor; a bootstrap capacitor; a bootstrap diode arranged in series with the bootstrap capacitor, an anode of the bootstrap diode directly electrically coupled to a high voltage bus, a cathode of the bootstrap diode directly electrically coupled to a first lead of the bootstrap capacitor, and a second lead of the bootstrap capacitor directly electrically coupled to the first transistor and the second transistor.

By electrically coupling a bootstrap diode to a high voltage bus and coupling a bootstrap capacitor to the bootstrap diode, followed by a regulator, it may be possible to supply a regulated voltage to a gate of a power stage of an inverter so that a transformer may be omitted from a gate driver board. Specifically, the bootstrap capacitor may provide input to a regulator that outputs a regulated signal to a transistor gate. The bootstrap capacitor and the bootstrap diode may be incorporated into a board that includes the power stage transistors of the inverter since they are significantly smaller than a flyback transformer that they replace. In addition, a voltage of the bootstrap capacitor is input to a voltage regulator to supply a regulated voltage to a gate of a transistor in the power stage so the power stage may operate at 100% duty cycle.

The present description may provide several advantages. In particular, the system and method described herein may provide an electric machine driving device that is higher in power density, smaller in size, and with increased functionality as compared to prior approaches. Further, the present approach may operate with a 100% duty cycle signal driving a gate of a power stage transistors of an inverter and it may be implemented with a short charge loop for the bootstrap capacitor so that higher voltage spikes may be eliminated in the circuitry. In addition, the approach provides for a regulator with a negative output voltage, which may be applied to turn off switches in the power stage of the inverter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 2B:
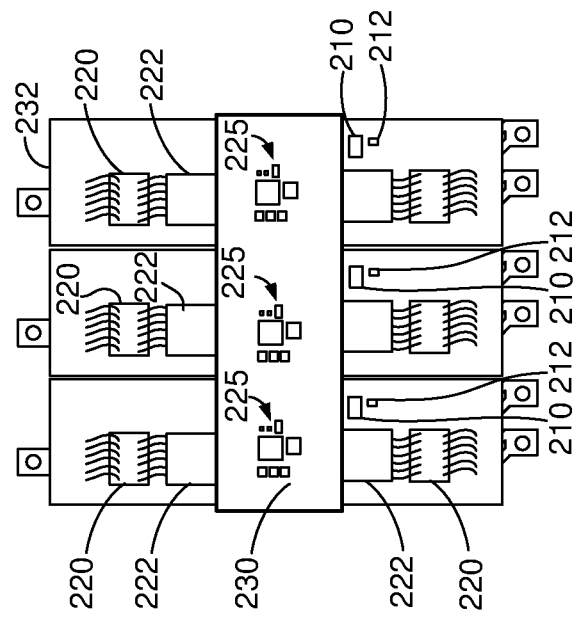
FIGS. 2A and 2B show example hardware board layouts for a high voltage power pack according to the present invention.
Figure 3:
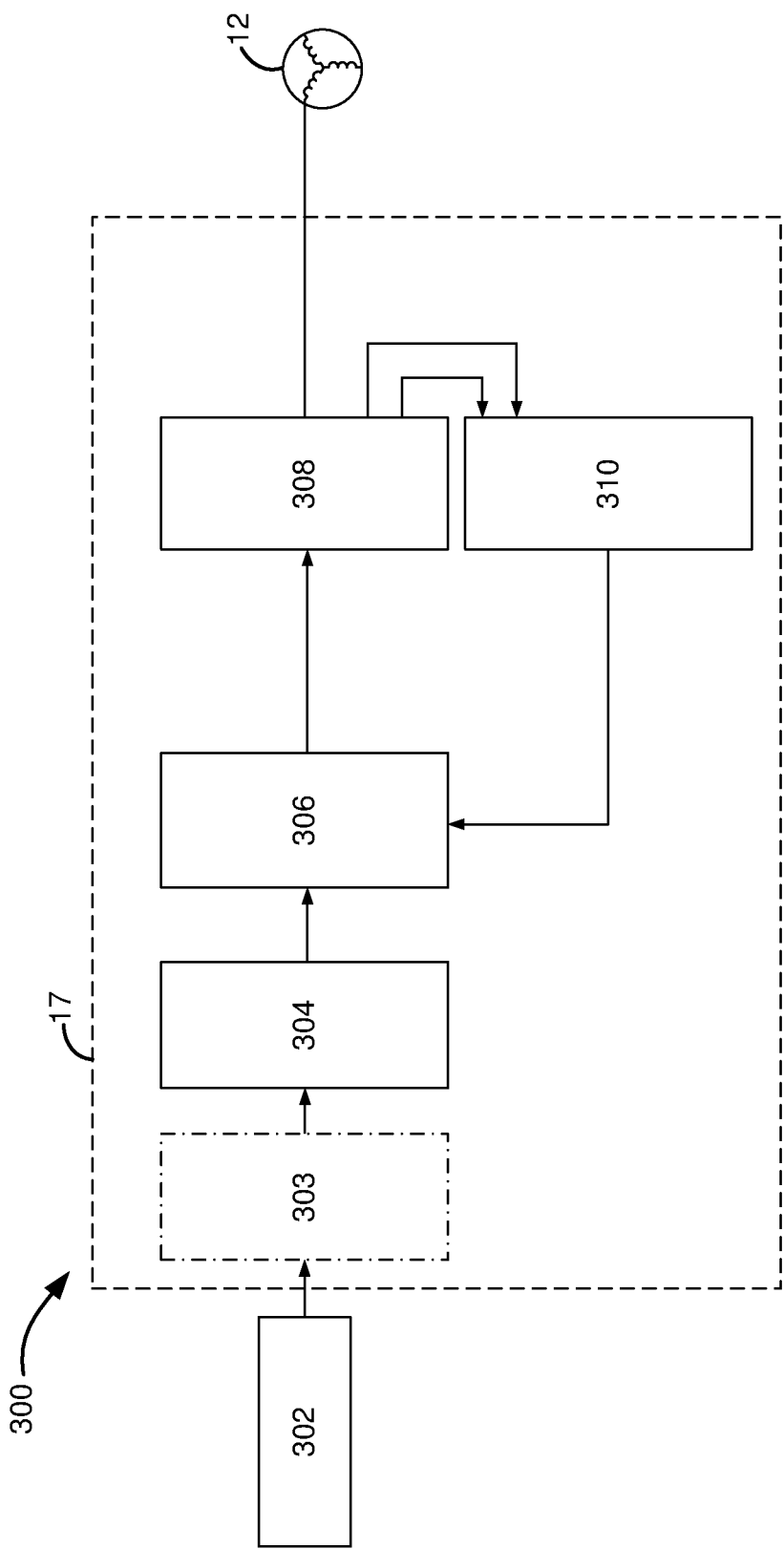
FIG. 3 shows a block diagram of a first example high voltage power pack.
Figure 4:
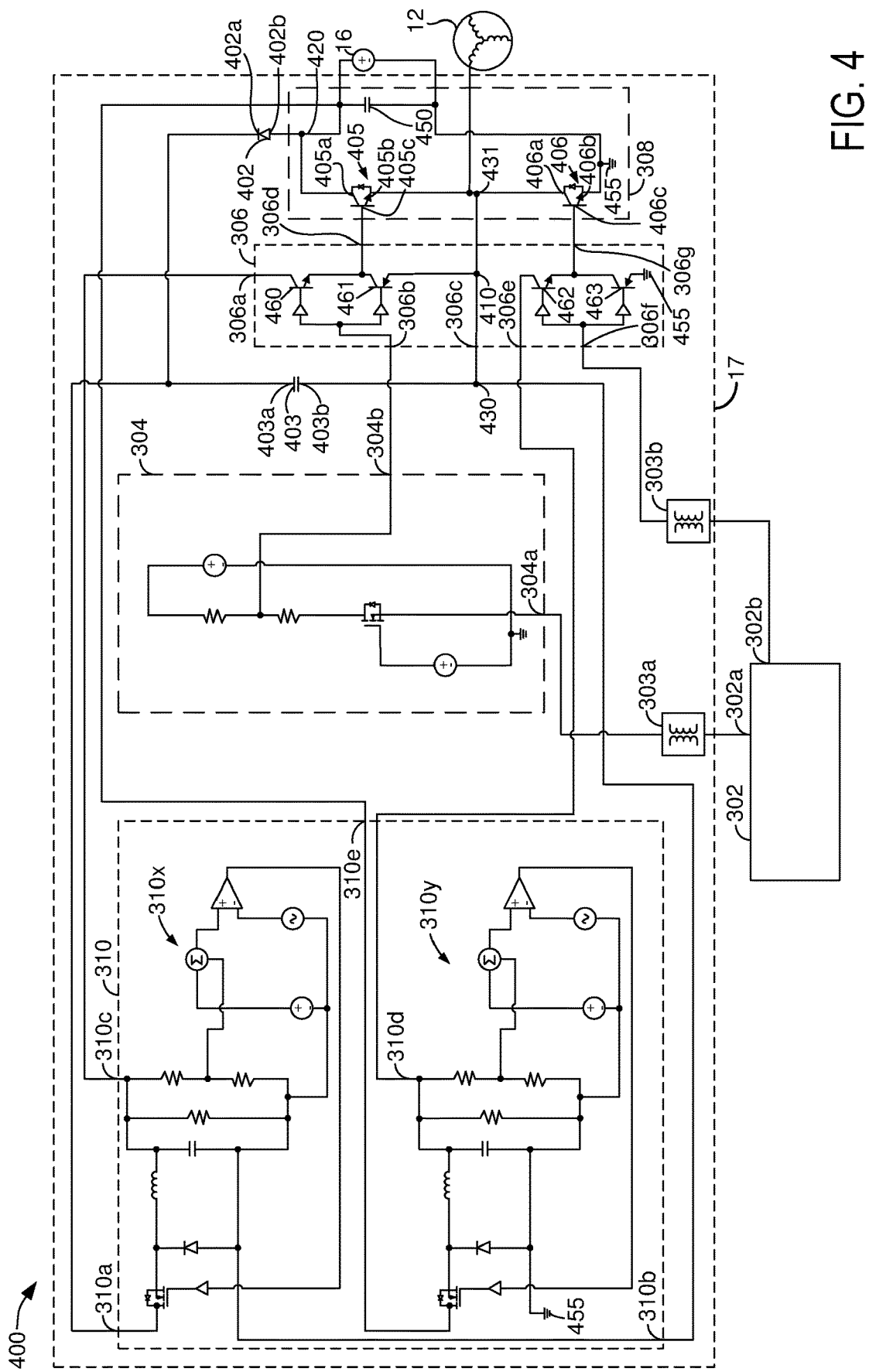
FIG. 4 shows an electrical schematic of a first example high voltage power pack circuit for supplying electrical power to an electric machine.
Figure 5:
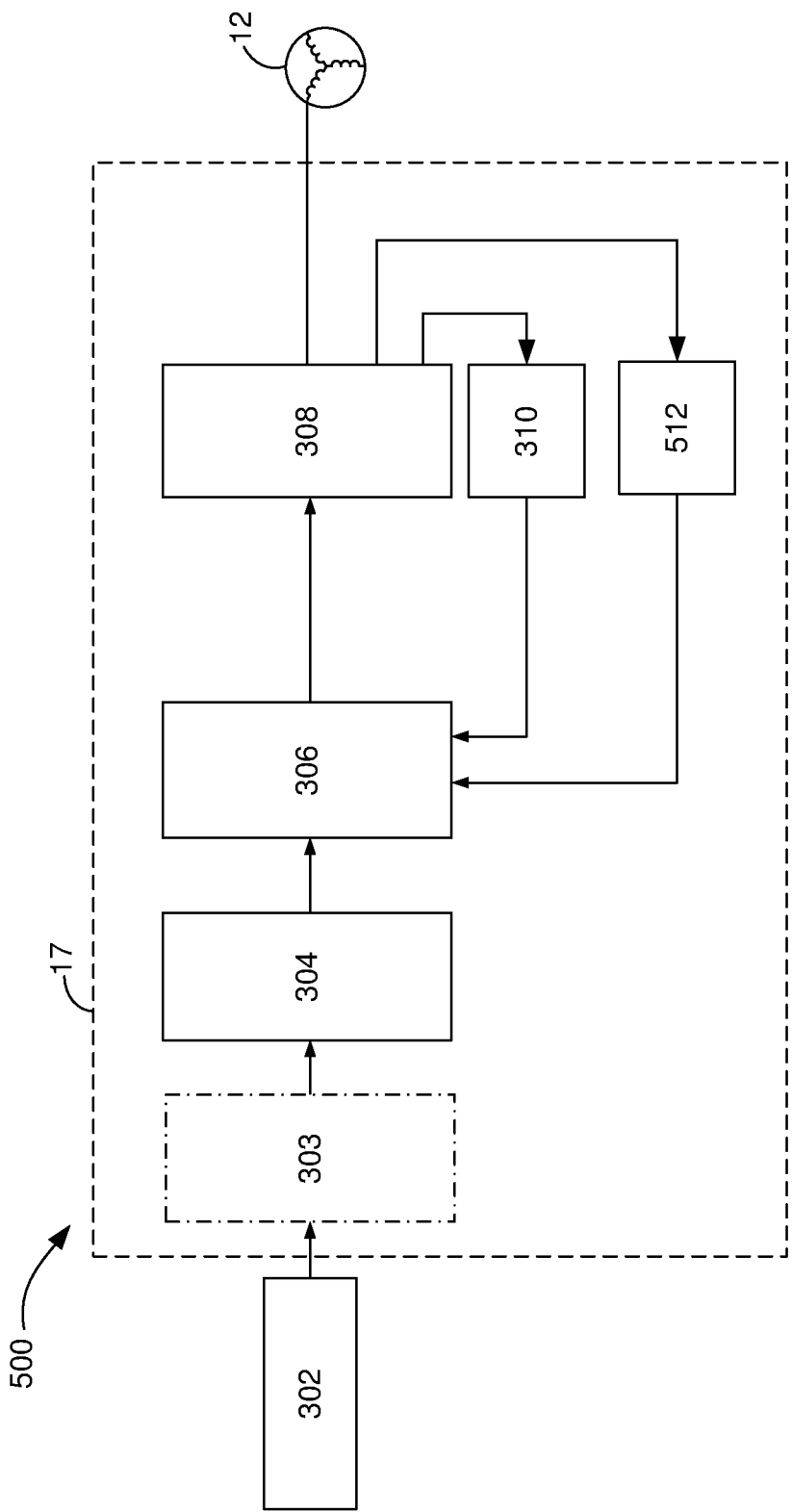
FIG. 5 shows a block diagram of a second example high voltage power pack.
Figure 6:
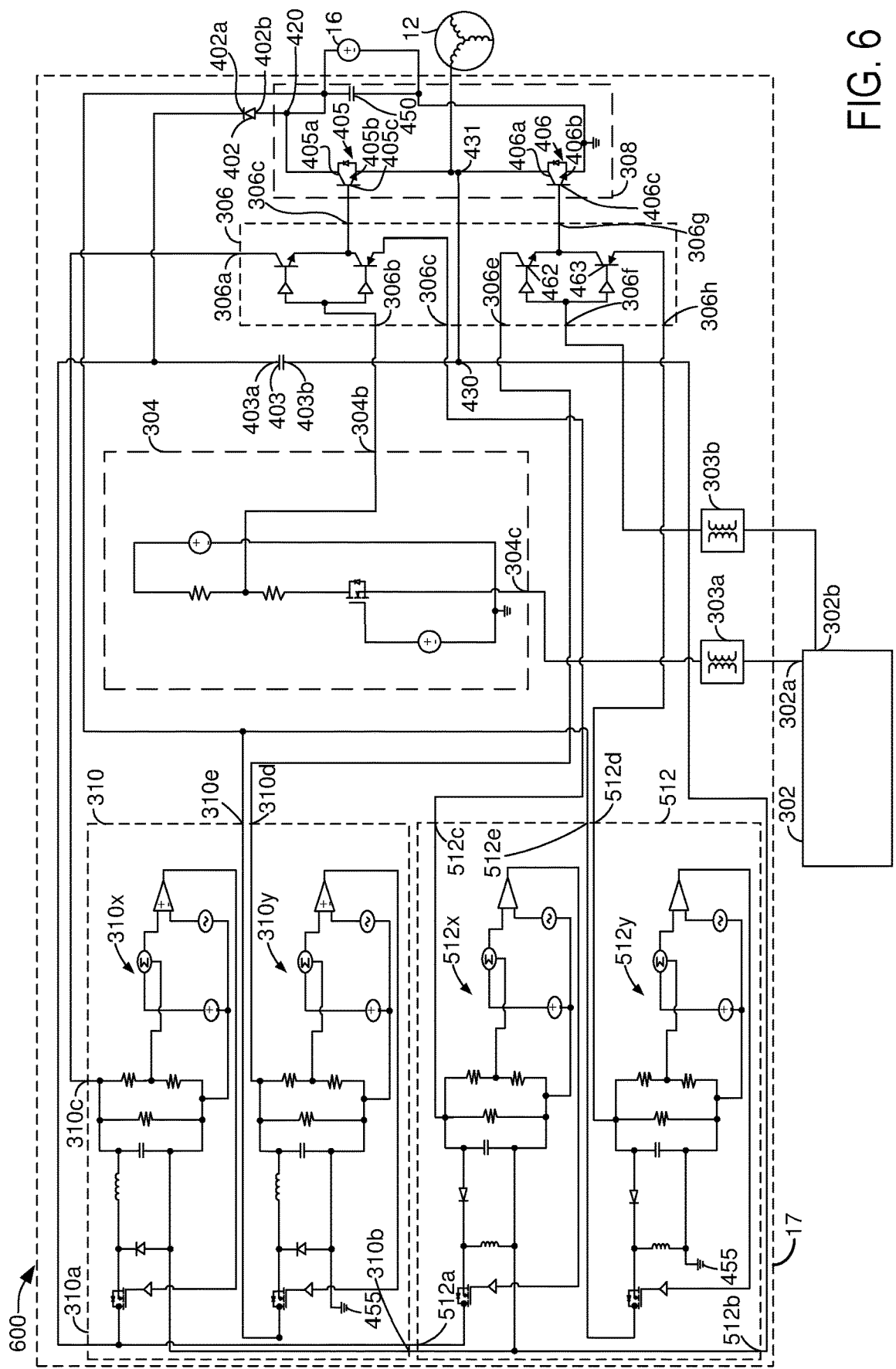
FIG. 6 shows an electrical schematic of a second example high voltage power pack circuit for supplying electrical power to an electric machine.
Figure 7:
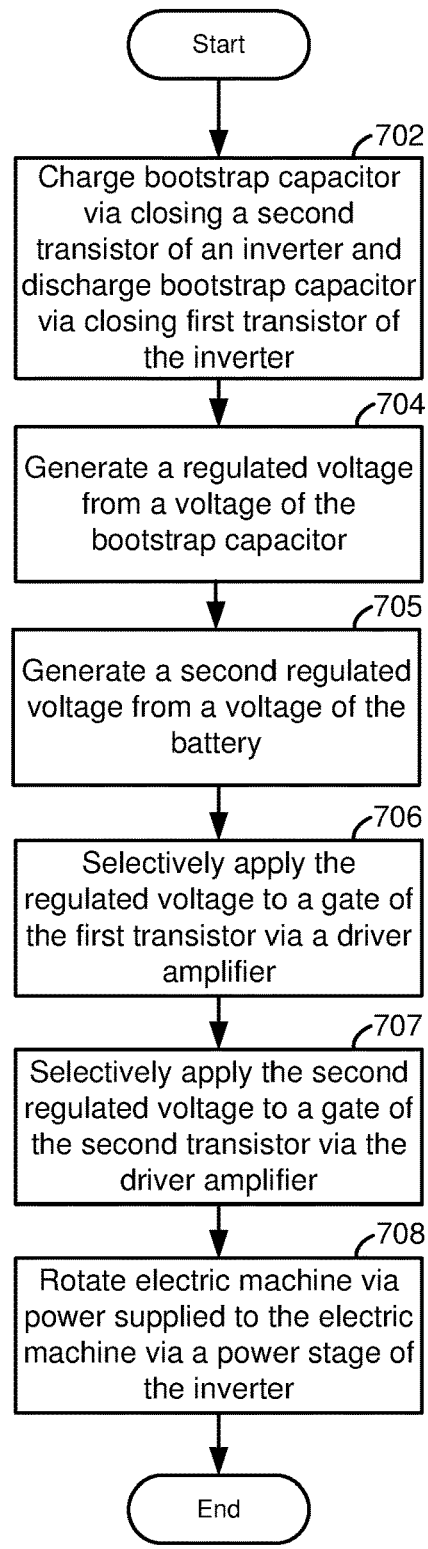
FIG. 7 shows a flowchart of a method for controlling a power stage of a high voltage power pack.

The following description relates to systems and methods for supplying electrical power to an electric machine. The electric machine may deliver propulsive effort to a vehicle. The present description provides for gate drive circuitry that eliminates need for a flyback transformer that may be electrically coupled to a high voltage (e.g., greater than 48 volts direct current (VDC)) bus of a power stage of an inverter. In addition, the systems and methods described herein may be extended to gate drive circuitry for lower voltage systems (e.g., less than 48 VDC). The system and methods may be applied to a vehicle of the type shown in FIG. 1. The system may include a power module or circuit board of the types shown in FIGS. 2A and 2B to increase power density of the power module and to reduce a length of a charge loop for the gate driver circuitry. Block diagrams for example high voltage power packs (e.g., integrated power modules) are shown in FIGS. 3 and 5. Detailed circuit diagrams for the high voltage power packs are shown in FIGS. 4 and 6. Finally, a method for operating a power module is shown in FIG. 7.

Figure 1:
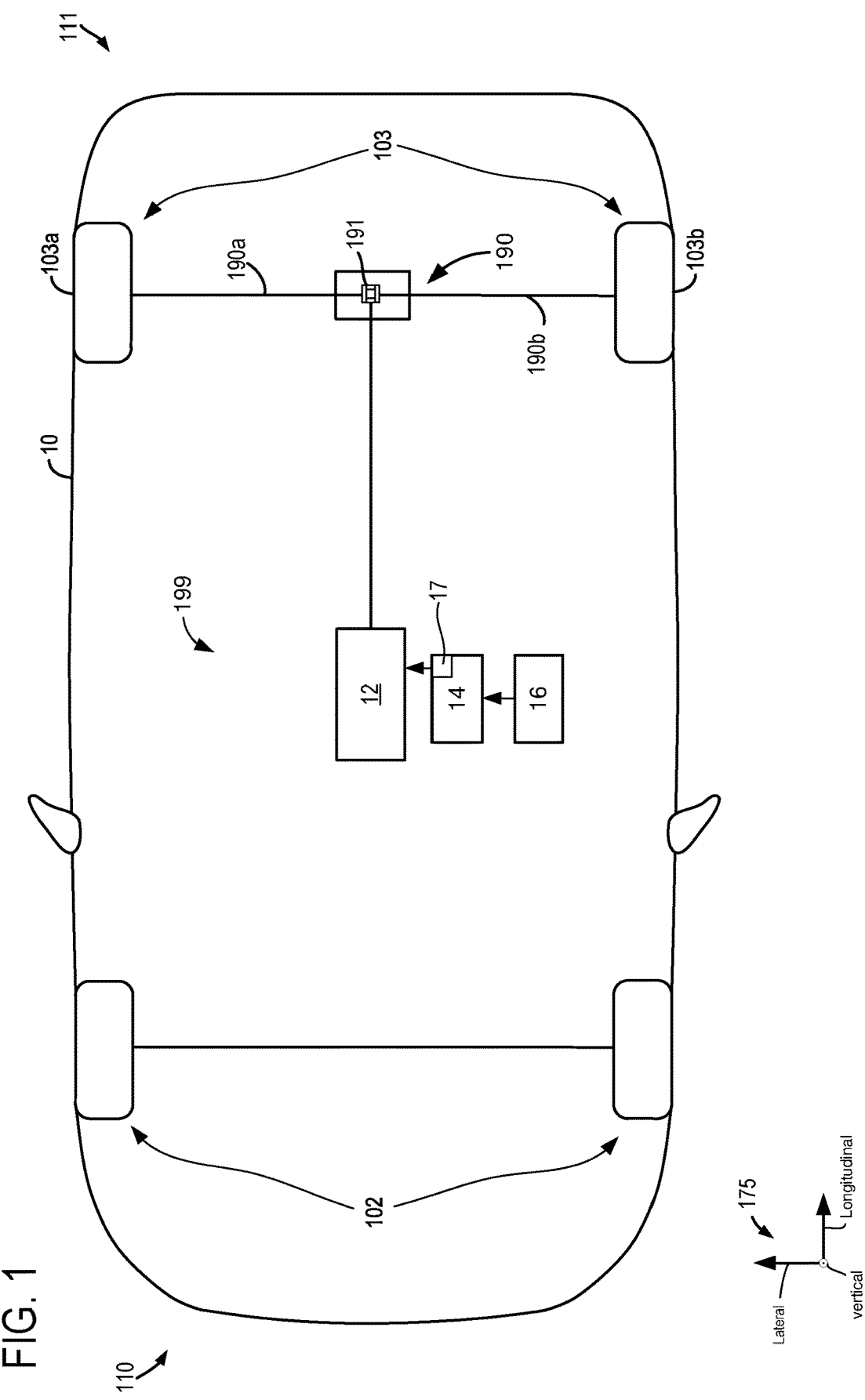
FIG. 1 is a schematic diagram of an example vehicle driveline that includes an electric machine.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 that may selectively provide propulsive effort to rear axle 190. In other examples, the propulsion source may provide propulsive effort to front wheels 102. Propulsion source 12 may be an electric machine (e.g., a motor/generator). Propulsion source 12 is shown mechanically coupled to differential 191, but a transmission may be included between propulsion source 12 and differential 191 in some examples. In other examples, propulsion source 12 may be incorporated into rear axle 190. Electric energy storage device 16 (e.g., a traction battery or capacitor) may provide high voltage (e.g., greater than 48 VDC) power to propulsion source 12 via inverter 14. Inverter 14 may convert direct current (DC) from electric energy storage device 16 to alternating current (AC). The AC may be supplied from inverter 14 to propulsion source 12. Alternatively, inverter 14 may convert AC from propulsion source 12 to DC that is supplied to electric energy storage device 16. Inverter 14 includes circuitry for one half-bridge 17 for supplying AC power to one phase of an electric machine.

Rear axle 190 comprises two half shafts, including a first or right haft shaft 190a and a second or left half shaft 190b.

The rear axle 190 may be an integrated axle that includes a differential gear set 191. Differential gear set 191 may be open when vehicle 10 is traveling on roads and negotiating curves so that right rear wheel 103a may rotate at a different speed than left rear wheel 103b. The orientation of vehicle 10 may be referenced to axis 175.

Figure 2A:
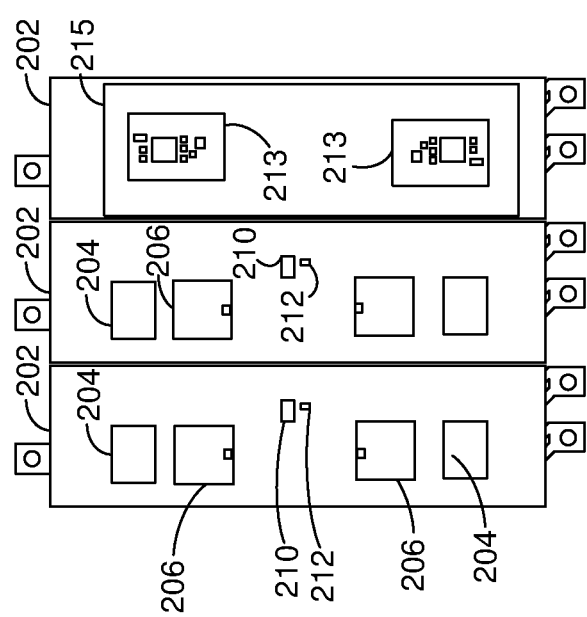

Turning now to FIG. 2A, a first example of three direct bonded copper (DBC) circuit boards 202 for a power stage of a three phase inverter is shown. In this example, the DBC circuit board 202 is a platform where bootstrap diodes 212, bootstrap capacitors 210, power stage free-wheeling diode dies 204, and insulated-gate bipolar (IGBT) transistor dies 206 for supplying three phase power to an electric machine may be integrated together. There is no separate gate driver board, so the capacitor charging loop is very short in length. The shorter charging loop length may reduce circuit inductance and a possibility of voltage spikes within the circuitry. In addition, the bootstrap capacitors 210 and bootstrap diodes 212 may be significantly lighter, weigh less, and may be more energy efficient than flyback transformers, as well as conventional bootstrap capacitors, that may be in prior art designs. Other transistors and electrical components may be coupled to the first DBC via wire-bondless connections.

It should be noted here that metal oxide semiconductor field effect transistors (MOSFETS) or other devices may be utilized instead of IGBTs, and the freewheeling diodes may be replaced by diodes that are integral with a transistor in the circuits shown herein. Further, it should be appreciated that the type of devices shown in the drawings (e.g., N-channel, P-channel, NPN, PNP, etc.) and other types of transistor devices may be replaced with other components without departing from the scope or intent of the present disclosure.

FIG. 2A also shows a view of a second DBC board 215 that is coupled to one of the three DBC circuit boards 202 that holds the bootstrap diodes 212, bootstrap capacitors 210, power stage free-wheeling diode dies 204, and insulated-gate bipolar (IGBT) transistor dies 206. The second type of DBC board 215 may hold other power stage related circuitry (e.g., level shifter circuits, driver amplifiers, positive voltage regulators, and negative voltage regulators) 213. In addition, the underside of the second of DBC board 215 may include interconnects between the circuitry of the first type of DBC board 202 and the second DBC board 215.

Referring now to FIG. 2B, a second example DBC circuit board 232 for a power stage of an inverter is shown. In this example, DBC circuit board 232 is a platform that includes free-wheeling diode dies 220, IGBT dies 222, bootstrap capacitors 210, and bootstrap capacitors 212. Again, placing the bootstrap capacitors 210 and bootstrap diodes 212 on a single DBC may reduce inductive spikes, reduce packaging size, and improve circuit efficiency. A printed circuit board (PCB) 230 is shown coupled to DBC circuit board 232. The printed circuit board 230 may include other gate drive related circuitry (e.g., level shifter circuits, driver amplifiers, positive voltage regulators, and negative voltage regulators) 225. This configuration is slightly larger than the configuration of FIG. 2A, but it may be 50% smaller than driver circuitry that includes flyback transformers. Additionally, the transistors and electrical components may be coupled to second DBC circuit board 230 via wire bonding.

Referring now to FIG. 3, a block diagram 300 of a first embodiment for driving one half-bridge (e.g., one phase of a three or more phase electric circuit for driving an electric machine) using a first high voltage power pack drive architecture is shown. The components of the high voltage power pack may be included in inverter 14. The high voltage power pack may be supplied with a command from a motor controller 302. The command may be cascaded to an optional signal isolator 303 and it may be processed via a level shifter circuit 304 that adjusts a level of the command signal so that it may be applied to change the operating states of transistors in the power stage 308. The level adjusted command is input to a driver amplifier 306, and the driver amplifier 306 selectively controls delivery of a regulated voltage to the gate of a transistor in the power stage 308. The driver amplifier 306 may include a first NPN Bi-polar transistor 460 and a second PNP Bi-polar transistor 461 for directing power flow through the driver amplifier 306. Of course, other devices (e.g., NMOS/PMOS) may be used in place of the NPN and PNP transistors. The power stage 308 may deliver high voltage electrical power to an electric machine 12. In addition, a bootstrap capacitor and diode may be electrically coupled to a high voltage bus of the power stage. The voltage across the bootstrap capacitor may be supplied to a voltage regulator 310, and the output of the voltage regulator may be selectively supplied to a gate of the power stage 308 via driver amplifier 306. In this first embodiment, a regulated gate voltage for transistor turn-on and zero volts for transistor turn-off may be supplied to one half-bridge in the inverter.

Referring now to FIG. 4, circuitry for implementing the first high voltage power pack drive illustrated in the block diagram of FIG. 3 is shown. Solid lines between the various electrical components shown in FIGS. 4, 6, and 8 should be understood to be electrical conductors. Circuitry 400 shows one third of a 3-phase inverter circuit (e.g., one phase/one half-bridge) for supplying electric power to a 3-phase electric machine 12. The circuitry may be replicated for additional phases (e.g., the circuit 400 may be replicated N times for driving an N phase electric machine, where N is an integer number). In FIG. 4, circuitry that provides specific functions are illustrated as being within dotted line bounded regions. For example, a voltage regulator indicated at 310 includes inductors, diodes, capacitors, resistors, operational amplifiers, and other devices that together provide a regulated output voltage via output 310c. The voltage regulator 310 includes a high side switch voltage regulator 310x and a low side switch voltage regulator 310y. The two voltage regulators have three inputs 310a, 310b, and 310e. The high side switch voltage regulator 310x is not referenced to ground so its output may be described a floating. The low side switch voltage regulator 310y is referenced to ground 455.

Motor controller 302 is shown with two outputs 302a and 302b. The two outputs may provide digital signals that command when to open and close transistors that are included in power stage 308. Signals from a first output 302a of motor controller 302 may be delivered to optional isolator (e.g., optical, galvanic, etc.) 303a and an isolated signal may be delivered to input 304a of level shifting circuit 304. Level shifting circuit 304 delivers a voltage level shifted signal from output 304b of level shifting circuit 304 to input 306b of driver amplifier 306.

Motor controller 302 also outputs a second signal via output 302b. The second signal may be delivered to optional isolator 303b Signals from a second output 302b of motor controller 302 are delivered to input 306f of driver amplifier 306.

Driver amplifier 306 directs signals from its output 306d to a gate 405c of first transistor 405 (e.g., high side switch) of power stage 308. Driver amplifier 306 selectively couples an output voltage from high side switch voltage regulator 310x received at first power input 306a to gate 405c of first transistor 405 via output 306d to activate transistor 405. On the other hand, driver amplifier 306 may also selectively couple a voltage (e.g., 0 volts) at second power input 306c from node 410 to gate 405c of first transistor 405 via output 306c to deactivate transistor 405. Node 410 is directly electrically coupled to the second lead 403b of bootstrap capacitor 403 via node 430, the emitter 405b of first transistor 405 via node 431, and the collector 406a of second transistor 406. Driver amplifier 306 also directs signals from its second output 306g to a gate 406c of second transistor 406 (e.g., low side switch) of power stage 308. Driver amplifier 306 selectively couples an output voltage from low side switch voltage regulator 310y received at second power input 306e to gate 406c of second transistor 406 via output 306g to activate transistor 406. On the other hand, driver amplifier 306 may also selectively couple a voltage (e.g., 0 volts) from ground 455 to gate 406c of second transistor 406 via output 306g to deactivate second transistor 406.

Power stage 308 controls electrical power flow to electric machine 12 from battery 16. The positive terminal + of battery 16 is directly electrically coupled to collector 405a of transistor 405 via high voltage bus 420. High voltage bus 420 may be comprised of conductors and electrical connectors. DC-link capacitor 450 is shown in parallel with battery 16. Collector 405a of transistor 405 is directly electrically coupled to high voltage bus 420. Herein, "directly electrically coupled" is defined to mean electrically coupled without any intervening active or passive electrical components other than conductors, connectors, and electrical couplings. Node 410 is directly electrically coupled to the emitter 405b of first transistor 405 and the collector 406a of second transistor 406. The emitter 406b of second transistor 406 is directly electrically coupled to ground 455. Input 310e of voltage regulator 310y is also directly electrically coupled to high voltage bus 420.

Anode 402b of bootstrap diode 402 is directly electrically coupled to high voltage bus 420 and cathode 402a of bootstrap diode 402 is directly electrically coupled to a first lead 403a of bootstrap capacitor 403. Bootstrap diode 402 permits electrical current to flow from battery 16 to bootstrap capacitor allowing bootstrap capacitor 403 to be charged from battery 16 when transistor 405 is turned off and transistor 406 is turned on. Bootstrap diode 402 also prevents electrical current from flowing from bootstrap capacitor 403 to battery 16. First lead 403a of bootstrap capacitor 403 is also directly electrically coupled to a first input 310a of voltage regulator 310, which feeds high side switch voltage regulator 310x. Second lead 403b of bootstrap capacitor 403 is directly electrically coupled to a second input 310b of voltage regulator 310, which is directly coupled to high side switch voltage regulator 310x. Second lead 403b of bootstrap capacitor 403 is also directly electrically coupled to node 410.

Voltage regular 310 may output a substantially constant voltage via high side switch voltage regulator 310x that may range from bus voltage to zero volts depending on requirements for transistor 405. The output of high side switch voltage regulator 310x may be adjusted by selecting different values of components that make up high side switch voltage regulator 310x. Likewise, voltage regulator 310 may output a substantially constant voltage via low side switch voltage regulator 310y that may range from bus voltage to zero volts depending on requirements for transistor 406. Voltage regulators 310x and 310y may be a buck regulator or another known stepdown voltage regulator design. Voltage output from high side switch voltage regulator 310x is routed to power input 306a of driver amplifier 306. Voltage output from low side switch voltage regulator 310y is routed to power input 306e of driver amplifier 306. The high side switch voltage regulator 310x and the low side switch voltage regulator 310y may output substantially constant voltages even when the input signal from the motor controller 302 is at a 100% duty cycle (e.g., always at a high level for the signal as opposed to oscillating between a low value for the signal and a high value for the signal). The 100% duty cycle may not be achievable when applying other bootstrap methods.

In this design, bootstrap capacitor 403 may be charged when transistor 406 is activated or closed such that electrical current flows from battery 16 through bootstrap diode 402, bootstrap capacitor 403, low side transistor 406, and to ground. The bootstrap capacitor 403 may discharge when transistor 405 is activated or closed.

Thus, this first design provides for a bootstrap capacitor, a bootstrap diode, and floating voltage regulators that are directly electrically coupled to the bootstrap capacitor to generate gate driving voltages for the power stage 308 of the inverter 14. The voltage regulators 310x and 310y each output a single positive voltage. The bootstrap capacitor, electrically coupled to the HV bus through a bootstrap diode does not provide the gate voltage directly to the gate of the power stage transistor. Instead, the bootstrap capacitor voltage is applied to a DC-DC regulator 310 where its output voltage is regulated to the voltage required by the power stage transistor 405/406. Therefore, it may be possible to supply a regulated voltage to a gate of a power stage of an inverter so that a transformer may be omitted from a gate driver board. The same bootstrap capacitor voltage can also be applied to another DC-DC voltage regulator that generates a negative output voltage as shown in FIG. 6. Therefore, the proposed technique can provide a regulated positive gate voltage though the first DC-DC regulator as well as a negative gate voltage through the second DC-DC regulator. Since the bootstrap capacitor voltage is regulated using the DC-DC regulator, a higher voltage drop across the bootstrap capacitor may be allowed without loss of circuit functionality. The higher allowable voltage drop across the bootstrap capacitor significantly reduces the size of the bootstrap capacitor. As such, the bootstrap capacitor and the bootstrap diode may be integrated into a board that includes the power stage transistors of the inverter since they may be significantly smaller than a conventional bootstrap capacitor or flyback transformer that they replace. The integration of the bootstrap capacitor and the bootstrap diode onto the same board that has the power stage transistors, may result in a small charge loop and a small discharge loop that eliminates the issue of high voltage spikes in a conventional bootstrap technique.

Referring now to FIG. 5, a block diagram 500 of an alternative second high voltage power pack drive is shown. The components of the second high voltage power pack may be included in inverter 14. The second high voltage power pack includes many of the same subsystems (e.g., level shifter, driver amplifier, etc.) as the first high voltage power pack described in FIGS. 3 and 4. Therefore, for the sake of brevity equivalent subsystems and electrical components will not be described again for FIGS. 5 and 6. However, note that devices and blocks shown in FIGS. 3 and 4 that are equivalent to devices and blocks shown in FIGS. 5 and 6 are labeled the same. For example, FIG. 3 includes a block 304 that is described as a level shifter. The identical level shifter is shown in FIG. 5 and it is again identified as block 304. Circuitry 600 shows one third of a 3-phase inverter circuit (e.g., one phase) for supplying electric power to electric machine 12. The circuitry may be replicated for additional phases (e.g., the circuit 600 may be replicated N times for driving an N phase electric machine, where N is an integer number).

Block diagram 500 of FIG. 5 differs from block diagram 300 of FIG. 3 in that the block diagram of FIG. 5 includes a voltage regulator 512 that outputs a negative voltage. The negative voltage is input to the driver amplifier 306 for the purpose of deactivating or turning off the transistors in power stage 308 when so commanded.

Referring now to FIG. 6, circuitry for implementing the second high voltage power pack drive illustrated in the block diagram of FIG. 5 is shown. Circuitry 600 is very similar to circuitry 400 shown in FIG. 4. Therefore, for the sake of brevity only the differences between circuitry 600 and circuitry 400 will be described in detail. The circuitry 600 that is not specifically explained is equivalent to and operates the same as the circuitry 400 in FIG. 4. Devices shown in FIG. 6 that have the same numbering as devices shown in FIG. 4 are equivalent and operate as previously mentioned in the description of FIG. 4.

Circuitry 600 includes a voltage regulator 512 that generates a negative voltage. The voltage regulator 512 includes a high side switch negative voltage regulator 512x and a low side switch negative voltage regulator 512y. High side switch negative voltage regulator 512x includes first and second inputs that are directly electrically coupled to bootstrap capacitor 403. Low side switch negative voltage regulator 512y includes first and second inputs that are directly electrically coupled to high voltage battery 16. Specifically, first input 512a of second voltage regulator 512, which is directly electrically coupled to high side switch negative voltage regulator 512x, is directly electrically coupled to first lead 403a of bootstrap capacitor 403. Second input 512b of second voltage regulator 512, which is directly electrically coupled to high side switch negative voltage regulator 512x, is directly electrically coupled to second lead 403b of bootstrap capacitor 403. Third input 512e is directly electrically coupled to high voltage bus 420 and low side switch negative voltage regulator 512y. Low side switch negative voltage regulator 512y is referenced to ground 455. The output 512c of the high side switch negative voltage regulator 512x is directly electrically coupled to the input 306c of driver amplifier 306. Thus, the output 512c of the high side switch negative voltage regulator 512x is directly electrically coupled to an emitter of a bi-polar transistor of the driver amplifier. The output 512d of the low side switch negative voltage regulator 512y is directly electrically coupled to the input 306h of driver amplifier 306. In this way, the output 512d of the low side switch negative voltage regulator 512y is directly electrically coupled to an emitter of a bi-polar transistor of the driver amplifier. Node 430 is directly electrically coupled to the second lead 403b of bootstrap capacitor 403 and node 431. Node 431 is directly coupled to the emitter 405b of first transistor 405 and to the collector 406a of second transistor 406.

The driver amplifier 306 may supply a positive voltage from high side switch voltage regulator 310x to the gate 405c of transistor 405 by way of driver amplifier 306 to allow current to flow through transistor 405. Alternatively, driver amplifier 306 may supply a negative voltage from high side switch negative voltage regulator 512x to the gate 405c of transistor 405 by way of driver amplifier 306 to prevent current flow through transistor 405. This embodiment may be desirable when a negative voltage is desired for deactivating/turning-off transistor 405. Similarly, driver amplifier 306 may supply a positive voltage from low side switch voltage regulator 310y to the gate 406c of transistor 406 by way of driver amplifier 306 to allow current to flow through transistor 406. Alternatively, driver amplifier 306 may supply a negative voltage from low side switch negative voltage regulator 512y to the gate 406c of transistor 406 by way of driver amplifier 306 to prevent current flow through transistor 406. This embodiment may be desirable when a negative voltage is desired for deactivating/turning-off transistor 406.

Thus, this second design provides for a bootstrap capacitor, a bootstrap diode, and two voltage regulators that are directly electrically coupled to the bootstrap capacitor to generate gate driving voltages for the high side switch in power stage 308 of the inverter 14. The bootstrap capacitor and bootstrap diode may be integrated into a DBC board that includes IGBTs as previously mentioned. There are two voltage regulators, electrically coupled to the high voltage battery 16, to provide positive and negative gate voltages for low side transistor, 406, in power stage 308. The voltage regulators may output positive and negative voltages to selectively activate and deactivate transistors 405 and 406.

For the circuits shown in FIGS. 4 and 6, the size of the bootstrap capacitor (e.g., the capacitance value of the bootstrap capacitor) may be at least an order of magnitude smaller as compared with the prior art. In addition, the bootstrap capacitor may be charged much faster in the present invention as compared to the prior art because the present invention charges the bootstrap capacitor via a high voltage source (e.g., 16). Therefore, the charge time for the bootstrap capacitor is significantly reduced as compared with prior art. In addition, the bootstrap capacitor voltage is regulated before it is applied to the gate of the transistor in the power stage. As such, even if the bootstrap capacitor is not fully charged, a regulated voltage will still be applied to the gate of the transistor (e.g., 405). These two factors may significantly reduce a required number of cycles that the transistor is commanded open and closed before the inverter becomes operable. Last, but not least, the present invention, applies a bootstrap capacitor that is directly charged using a high voltage bus through bootstrap diode. This feature may further improves/reduce the required charge time of the bootstrap capacitor before the circuit becomes operable.

The systems of FIGS. 1-6 provide for a drive circuit for an electric machine, comprising: a first transistor; a second transistor, the second transistor arranged in series with the first transistor and directly electrically coupled to the first transistor; a bootstrap capacitor; a bootstrap diode arranged in series with the bootstrap capacitor, an anode of the bootstrap diode directly electrically coupled to a high voltage bus, a cathode of the bootstrap diode directly electrically coupled to a first lead of the bootstrap capacitor, and a second lead of the bootstrap capacitor directly electrically coupled to the first transistor and the second transistor. The drive circuit includes where the first transistor is directly electrically coupled to the high voltage bus, and where the second transistor is directly electrically coupled to a ground reference. The drive circuit includes where the first transistor, second transistor, bootstrap capacitor, and bootstrap diode are included on a single board. The drive circuit further comprises a positive voltage regulator and a negative voltage regulator, the positive voltage regulator and the negative voltage regulator directly electrically coupled to a driver amplifier. The drive circuit includes where the drive circuit is transformer-less. The drive circuit further comprises a driver amplifier, the driver amplifier directly electrically coupled to the first transistor and the second lead of the bootstrap capacitor. The drive circuit further comprises four voltage regulators, the four voltage regulators directly electrically coupled to the driver amplifier. The drive circuit includes where two of the four voltage regulator are configured to deliver negative voltages.

The system of FIGS. 1-6 also provides for a drive circuit for an electric machine, comprising: a first voltage regulator a bootstrap capacitor directly electrically coupled to an input of the first voltage regulator; and a driver amplifier directly electrically coupled to an output of the first voltage regulator. The drive circuit further comprises a bootstrap diode, the bootstrap diode directly electrically coupled to the bootstrap capacitor and a high voltage bus. The drive circuit further comprises a transistor included in a power state of an inverter, where a voltage output of the driver amplifier is coupled to a gate of the transistor of the power stage of the inverter, and where the first voltage regulator includes a positive voltage output. The drive circuit further comprises a second voltage regulator, the second voltage regulator including a negative voltage output, the negative voltage output directly electrically coupled to the driver amplifier; and further comprises an output of the power stage directly electrically coupled to an electric machine. The drive circuit further comprises a motor controller input included in the driver amplifier.

Referring now to FIG. 7, an example method for operating circuitry to provide electrical power to an electric machine is shown. The method described herein may be provided via the circuitry shown in FIGS. 1-6. Portions of method 700 may be stored as executable instructions stored in non-transitory memory of a controller while other portions of method 700 may be provided by virtue of a design of circuitry.

At 702, method 700 charges a bootstrap capacitor (e.g., 403) via closing a second transistor (e.g., 406) of a power stage of an inverter. The bootstrap capacitor is charged so that a voltage may be delivered to an input of one or more voltage regulators. Method 700 also discharges the bootstrap capacitor via closing or turning on a first transistor (e.g., 405). The bootstrap capacitor may be discharged as part of a sequence to supply electric power to the electric machine 12. The bootstrap capacitor may be continuously connected to the inputs of the one or more voltage regulators. Method 700 proceeds to 704.

At 704, method 700 generates a first regulated voltage from a voltage of the bootstrap capacitor 403. The first regulated voltage may be provided via a voltage regulator circuit as shown in FIG. 6. Method 700 proceeds to 705.

At 705, method 700 generates a second regulated voltage from a voltage of the battery 16. The second regulated voltage may be provided via a second voltage regulator circuit as shown in FIG. 6. Method 700 proceeds to 706.

At 706, method 700 selectively applies the first regulated voltage generated at 704 to a gate of a first transistor (e.g., 405) in a power stage of a power module or inverter. By selectively applying the first regulated voltage to the gate of the first transistor, the first transistor may be switch between open (e.g., no conduction through the transistor) and closed (conduction permitted through the transistor) states. In one example, the first regulated voltage may be supplied to the gate of the first transistor as shown in FIGS. 4 and 6. Specifically, a driver amplifier may selectively deliver the first regulated voltage to the gate of the first transistor. The first regulated voltage may cause the first transistor to close to allow electrical current to flow through itself and to an electric machine. Method 700 proceeds to 707.

At 707, method 700 selectively applies the second regulated voltage generated at 705 to a gate of a second transistor (e.g., 406) in a power stage of a power module or inverter.

By selectively applying the second regulated voltage to the gate of the second transistor, the second transistor may be switch between open (e.g., no conduction through the transistor) and closed (conduction permitted through the transistor) states. In one example, the second regulated voltage may be supplied to the gate of the second transistor as shown in FIGS. 4 and 6. Specifically, a driver amplifier may selectively deliver the second regulated voltage to the gate of the second transistor. The second regulated voltage may cause the second transistor to close to allow electrical current to flow through itself and to an electric machine. Method 700 proceeds to 708.

At 708, method 700 rotates the electric machine via supplying electrical power to the electric machine via the power stage of the power module. The electric machine may operate with three or more phases of electrical power. Method 900 proceeds to exit.

In this way, a regulated voltage may be supplied to a gate of a transistor or a power stage of an inverter or power module. The circuits shown in FIGS. 4 and 6 are free of transformers. In addition, the circuits shown in FIGS. 4 and 6 directly drive gates of transistors 405 and 406 via driver amplifier 306 so that chances of generating undesirable oscillations in the circuitry due to additional parasitic elements may be avoided. The regulated voltage for the high side switch may be generated from a voltage of a bootstrap capacitor. The regulated voltage for low side switch may be generated from a high voltage battery.

Thus, the method of FIG. 7 provides for a method for operating a drive circuit for an electric machine, comprising: charging a capacitor via closing a second transistor and discharging the capacitor via closing a first transistor; generating a regulated voltage from a voltage of the capacitor; and applying the regulated voltage to the first transistor. The method further comprises generating a second regulated voltage from a voltage of a battery, and where the second regulated voltage is applied to a gate of the second transistor. The method further comprises selectively delivering the regulated voltage to the gate of the first transistor via a driver amplifier, the driver amplifier including at least two transistors. The method includes where the regulated voltage is selectively delivered to the gate of the first transistor in response to a command from a motor controller. The method further comprises generating a second regulated voltage from a voltage of a battery and selectively delivering the second regulated voltage to a gate of the second transistor via a command from a motor controller. The method includes where the capacitor is charged via a battery. The method includes where the regulated voltage is generated via a step-down regulator.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. Further, the circuitry described herein may be modified or configured in an alternative way without departing from the scope and/or breadth of the methods and systems described herein. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drive circuit for an electric machine, comprising:
   a first transistor;
   a second transistor, the second transistor arranged in series with the first transistor and directly electrically coupled to the first transistor;
   a bootstrap capacitor;
   a bootstrap diode arranged in series with the bootstrap capacitor, an anode of the bootstrap diode directly electrically coupled to a high voltage bus, a cathode of the bootstrap diode directly electrically coupled to a first lead of the bootstrap capacitor, and a second lead of the bootstrap capacitor directly electrically coupled to the first transistor and the second transistor; and
   a positive voltage regulator and a negative voltage regulator, the voltage regulator and the negative voltage regulator directly electrically coupled to a driver amplifier.

2. The drive circuit of claim 1, where the first transistor is directly electrically coupled to the high voltage bus, and where the second transistor is directly electrically coupled to a ground reference.

3. The drive circuit of claim 1, where the first transistor, second transistor, bootstrap capacitor, and bootstrap diode are included on a single board.

4. The drive circuit of claim 1, where the first transistor is included in the driver amplifier.

5. The drive circuit of claim 1, where the drive circuit is transformer-less.

6. The drive circuit of claim 1, further comprising a driver amplifier, the driver amplifier directly electrically coupled to the first transistor and the second lead of the bootstrap capacitor.

7. The drive circuit of claim 6, further comprising two additional voltage regulators, the two additional voltage regulators directly electrically coupled to the driver amplifier.

8. The drive circuit of claim 7, where one of the two additional voltage regulators is configured to deliver a negative voltage.

9. A method for operating a drive circuit for an electric machine, comprising:
   charging a capacitor via closing a second transistor and discharging the capacitor via closing a first transistor;
   generating a regulated voltage from a voltage of the capacitor; and
   applying the regulated voltage to the first transistor.

10. The method of claim 9, further comprising generating a second regulated voltage from a voltage of a battery, and where the second regulated voltage is applied to the second transistor.

11. The method of claim 10, further comprising selectively delivering the regulated voltage to the first transistor via a driver amplifier, the driver amplifier including at least two transistors.

12. The method of claim 11, where the regulated voltage is selectively delivered to the first transistor in response to a command from a motor controller.

13. The method of claim 9, further comprising generating a second regulated voltage from a voltage of a battery and selectively delivering the second regulated voltage to the second transistor via a command from a motor controller.

14. The method of claim 9, where the capacitor is charged via a battery.

15. The method of claim 9, where the regulated voltage is generated via a stepdown regulator.

16. A drive circuit for an electric machine, comprising:
    a first voltage regulator;
    a bootstrap capacitor directly electrically coupled to an input of the first voltage regulator;
    a driver amplifier directly electrically coupled to an output of the first voltage regulator;
    a bootstrap diode, the bootstrap diode directly electrically coupled to the bootstrap capacitor and a high voltage bus;
    a transistor included in a power stage of an inverter, where a voltage output of the driver amplifier is coupled to a gate of the transistor of the power stage of the inverter, and where the first voltage regulator includes a positive voltage output;
    a second voltage regulator, the second voltage regulator including a negative voltage output, the negative voltage output directly electrically coupled to the driver amplifier; and
    an output of the power stage directly electrically coupled to an electric machine.

17. The drive circuit of claim 16, further comprising a motor controller input included in the driver amplifier.

* * * * *